US008313565B2

(12) United States Patent
Sarshar et al.

(10) Patent No.: US 8,313,565 B2
(45) Date of Patent: Nov. 20, 2012

(54) CYCLONIC SEPARATOR AND A METHOD OF SEPARATING FLUIDS

(75) Inventors: Mahmood Mir Sarshar, Beaconsfield (GB); Ali Najam Miraz Beg, Milton Keynes (GB); Carl Wordsworth, Bedford (GB)

(73) Assignee: Caltec Limited, Bedfordshire (GB)

( * ) Notice: Subject to any disclaimer, the term of this patent is extended or adjusted under 35 U.S.C. 154(b) by 501 days.

(21) Appl. No.: 12/377,049

(22) PCT Filed: Jul. 19, 2007

(86) PCT No.: PCT/GB2007/002759
§ 371 (c)(1), (2), (4) Date: Apr. 16, 2010

(87) PCT Pub. No.: WO2008/020155
PCT Pub. Date: Feb. 21, 2008

(65) Prior Publication Data

US 2010/0200521 A1 Aug. 12, 2010

(30) Foreign Application Priority Data

Aug. 12, 2006 (GB) .................................. 0616101.2

(51) Int. Cl.
*B01D 19/00* (2006.01)

(52) U.S. Cl. ................ 95/261; 95/258; 96/212; 96/210; 96/188; 96/195; 210/788; 210/188; 210/512.1

(58) Field of Classification Search .................... 95/261, 95/258; 96/209, 212, 210, 188, 195; 210/788, 210/188, 512.1
See application file for complete search history.

(56) References Cited

U.S. PATENT DOCUMENTS 3,007,542 A * 11/1961 Giampapa et al. .............. 95/261
4,363,641 A 12/1982 Finn
4,859,347 A * 8/1989 Simon et al. .................. 210/788
5,071,557 A * 12/1991 Schubert et al. ........... 210/512.2
5,100,552 A * 3/1992 Carroll ....................... 210/512.1
5,186,836 A 2/1993 Gauthier et al.
6,331,196 B1 12/2001 Alperovitch
2003/0232228 A1* 12/2003 Grasso ........................... 429/26
(Continued)

FOREIGN PATENT DOCUMENTS

AU 750 936 B2 8/2002
(Continued)

OTHER PUBLICATIONS

The International Search report corresponding to PCT Application No. PCT/GB2007/002759, dated Nov. 30, 2007.

(Continued)

*Primary Examiner* — Duane Smith
*Assistant Examiner* — Douglas Theisen
(74) *Attorney, Agent, or Firm* — Knobbe Martens Olson & Bear LLP

(57) ABSTRACT

A cyclonic separator for separating fluids comprises an inlet chamber (6) having means for inducing fluids flowing through the chamber to swirl around an axis, a cyclonic separation chamber (10) connected to receive fluids from the inlet chamber, and an outlet chamber (8) connected to receive fluids from the cyclonic separation chamber. The outlet chamber (8) has a tangential outlet (22) for relatively dense fluids and an axial outlet (24) for less dense fluids. The separation chamber is elongate and has a length L and an inlet diameter D, where L/D is in the range 1 to 10.

31 Claims, 3 Drawing Sheets

U.S. PATENT DOCUMENTS

| | | | |
|---|---|---|---|
| 2006/0160190 A1 | 7/2006 | Bruckmayer | |

FOREIGN PATENT DOCUMENTS

| | | | |
|---|---|---|---|
| EP | 0 313 197 A | | 4/1989 |
| FR | 2 662 619 A | | 12/1991 |
| GB | 1 506 877 A | | 4/1978 |
| GB | 2 000 054 A | | 1/1979 |
| GB | 2 263 077 A | | 3/1993 |
| WO | WO 99/22873 | * | 5/1999 |
| WO | WO 2006/101813 A1 | | 9/2006 |

OTHER PUBLICATIONS

The UK Search report for counterpart Application No. GB0616101.2, dated Nov. 24, 2006.

* cited by examiner

CYCLONIC SEPARATOR AND A METHOD OF SEPARATING FLUIDS

RELATED APPLICATIONS

This application is the U.S. National Phase filing under 35 U.S.C. §371 of PCT/GB2007/002759, filed Jul. 19, 2007, entitled "Cyclonic Separator and a Method of Separating Fluids", which designated the United States and was published in English on Feb. 21, 2008, which claims priority under 35 U.S.C. §119(a)-(d) to Great Britain Application No. 0616101.2, filed Aug. 12, 2006, the entire content of which is incorporated herein by reference.

FIELD OF THE INVENTION

The present invention relates to a cyclonic separator and a method of separating single-phase fluids, as well as an apparatus for separating single-phase fluids. In particular, but not exclusively, it relates to a method and apparatus for separating dissolved gases from liquids (i.e. for degassing liquids), or for separating mixtures of liquids having different vapour pressures.

BACKGROUND OF THE INVENTION

The phrase "single-phase fluids" as used herein means either liquids with dissolved gases, or mixtures of liquids having different vapour pressures. Such liquids can be separated into their component parts either by taking the dissolved gas out of solution or, in the case of mixtures of liquids having different vapour pressures, by converting one of the liquids to vapour form and then separating it from the remaining liquid. The original single phase fluid can thus be converted into separate gas and liquid phases. It should be noted that while the term "single phase fluid" refers essentially to liquids of the types described above, it is not intended to exclude fluids that include such liquids in combination with some free gas, for example in the form of bubbles. In this latter case, the invention may serve to separate the free gas from the liquid while simultaneously separating the gas portion from the liquid portion of the single phase fluid.

Dissolved gases are frequently present in liquids in their natural form. For example, raw crude oil usually contains some dissolved hydrocarbon gas. Air or other gases may also become dissolved in liquids during their production, processing or transportation. For example, chlorine gas may be added to water during treatment. It may be necessary to remove some or all of this dissolved gas prior to processing, transportation or storage. For example, in the case of oil, if the dissolved gas is not removed, it may subsequently be released by agitation during transportation or by a reduction in pressure, leading to a potentially dangerous build-up of explosive gas in containers, tankers or other sources handling such fluids.

One widely-used method of degassing liquids is to pass the liquid through a separator vessel in which the pressure of the fluid is reduced to below atmospheric pressure. As the pressure is reduced the dissolved gas comes out of solution and rises to the surface of the liquid as bubbles. The evolved gas can then be removed and separated from the remaining liquid. This method is used in the oil and gas industry to remove dissolved hydrocarbon gases from liquid crude oil before it is sent to storage tanks or to tankers for export.

The system described above is however complex and bulky, requiring large separator tanks and vacuum pumps or multi-stage eductors (i.e. ejectors or jet pumps) and compressors to generate the required low pressure. A pumping system is then needed to boost the pressure of the degassed liquid back to the level required for transportation by pipeline to a storage tank or tanker. The pressure of the separated gas phase, which is at or below atmospheric pressure, may also have to be boosted using a compressor or eductor/jet pump, so that it can be transported or flared.

A similar method may also be used for separating mixtures of liquids having different vapour pressures. Lowering the pressure of the mixture to below the vapour pressure of one of the liquids causes that liquid to be transformed into a free gaseous phase, which can then be separated from the remaining liquid. This method is commonly used for removing chemicals from mixtures of liquids.

A cyclonic separator is described in international patent application No. WO99/22873A. The device is designed primarily for separating dust particles from air in a vacuum cleaner, although it may also be used for separating mixtures of gases and liquids. During use, a vortex is created having a radial pressure gradient with a low pressure at the centre of the vortex and higher pressures at greater radii. A reduction in pressure can thus be achieved along the axis of the separator within its central core.

There is no suggestion that the above said cyclonic device can be used for degassing liquids. However, even if the separator could be driven hard enough by increasing the flow rate through it to cause some dissolved gas in the liquid to come out of solution, the separator is not designed for this use and the maximum reduction in pressure that can be achieved (to approximately 0.9 bar) is not sufficient for efficient separation of dissolved gases. The separator is also only able to operate over a relatively narrow range of flow rates.

SUMMARY OF THE INVENTION

Another type of separator, known as a hydrocyclone, is known from GB 2263077A. This device uses cyclonic action to separate fluids of different densities and has an inlet at one end for mixtures of fluids, a first outlet at the same end for less dense fluids portions and a second outlet at the opposite end of the device for more dense fluid portions. This is a "reverse flow" device, in which the fluid portions flow in opposite directions to the respective outlets and both fluids exist within the original fluid mixture. The disadvantages of this device are that there is a large pressure loss across the unit (i.e. the difference between the inlet pressure and the outlet pressure is large) and no pressure recovery is achieved.

It is an object of the present invention to provide a method and an apparatus for separating fluids, which mitigates at least some of the aforesaid disadvantages.

According to the present invention there is provided a cyclonic separator for separating single phase fluids, the cyclonic separator comprising an inlet chamber, a cyclonic separation chamber and an outlet chamber, all arranged sequentially such that in use fluids flow substantially uniaxially through the separator, the inlet chamber having means for inducing fluids flowing through the chamber to swirl around an axis, the cyclonic separation chamber being constructed and arranged to receive fluids from the inlet chamber and separate those fluids by cyclonic action into a gas portion and a liquid portion, and the outlet chamber being connected to receive the gas and liquid portions from the cyclonic separation chamber and having a first outlet for liquids and a second outlet for gases, wherein the separation chamber is elongate and has a length L and an inlet diameter D, where L/D is in the range of 1 to 10. Preferably, L/D is in the range 2 to 10, more preferably 5 to 7. The inlet diameter D refers to the internal diameter of the chamber at its inlet point.

Using the cyclonic separator, the pressure of fluid passing through the device can be readily reduced to about 0.3 bar absolute if the inlet pressure is between 2 to 3 bar absolute, which provides for rapid and effective degassing of many single-phase fluids containing dissolved gas. The shape and dimensions of the separation chamber provide a stable vortex over a wide range of flow rates, which is not significantly disrupted by fluctuations in the flow rate or inlet pressure. This ensures a good separation of gas and liquid phases, with very little carry over of liquid within the separated gas.

The pressure reduction achieved within the vortex is largely recovered in the outlet chamber of both liquid and gas phase by the action of the involute feature of these chambers. Part of the pressure recovery is also achieved by the venturi configuration of the separation chamber where the enlargement of the area near the outlet of the separation chamber reduces the velocity of the fluids and contributes to pressure recovery. The pressure drop across the device is therefore very small, which provides for efficient degassing with minimal energy requirement and may avoid the need for downstream pumps and compressors.

The apparatus is also very compact, mechanically simple and reliable, it is capable of continuous operation and requires no active control. It has a large turn-down, typically in the range 5:1, allowing it to maintain acceptable operation even if the flow rate drops to one fifth of its normal value. The separator provides a uni-axial flow regime, with all the fluids flowing from the inlet at one end of the device to the respective outlets at the opposite end of the device.

The elongate separation chamber may include a throat portion with a diameter $D_T$, where $D_T<D$. Advantageously, the throat diameter $D_T$ is such that $D_T/D$ is in the range of 0.3 to <1.0, preferably 0.5 to 0.9. Advantageously, the throat portion has a length $L_T$, where $L_T/D_T$ is less than 3.5, and is preferably in the range 0.1 to 3, more preferably 0.5 to 2.5. The throat increases the rotational speed of the vortex and provides a greater pressure reduction at the centre of the vortex for more effective degassing. It also helps to concentrate the separated gas within the central core of the separation chamber at the outlet end where the vortex finder is located.

The elongate separation chamber may include a convergent portion upstream of the throat portion. Advantageously, the convergent portion is enclosed by a wall that is inclined relative to the axis of the separation chamber at an included angle $\theta_C$ that is less than 45°, and is preferably in the range 5° to 35°, more preferably 5° to 30°.

The elongate separation chamber may include a cylindrical inlet portion upstream of the convergent portion. Advantageously, the inlet portion has a length $L_i$, where $L_I/D$ is less than 2 and is preferably in the range 0.1 to 1.

The elongate separation chamber may include a divergent portion downstream of the throat portion. Advantageously, the divergent portion is enclosed by a wall, which is inclined relative to the axis of the separation chamber at an included angle $\theta_D$ that is less than 30°, and is preferably in the range 2° to 20°, more preferably 5° to 15°. The divergent portion provides for pressure recovery from the vortex, which may reduce or eliminate the need for downstream pumps or compressors. It also contributes to the stability of the vortex, which is necessary for effective separation of the gas and liquid phases at different flow rates.

The elongate separation chamber may include a cylindrical outlet portion downstream of the divergent portion. Advantageously, the outlet portion has a length $L_O$ and $L_O/D$ is less than 2, and is preferably in the range 0.1 to 1.

Advantageously, the inlet chamber includes a curved inlet duct of decreasing radius along the axis of fluid entry, and preferably decreasing cross-sectional area. The curved inlet duct preferably has an involute shape and extends around approximately 360°. The involute inlet duct deflects and accelerates the incoming fluids creating a rapidly rotating vortex within a single turn.

Advantageously, the inlet chamber has a substantially tangential inlet and an axial outlet. The inlet chamber may also include another involute.

The outlet chamber may include a curved outlet duct of increasing radius and preferably increasing cross-sectional area. The outlet duct preferably has an involute shape and extends around approximately 360°. The outlet duct decelerates and repressurises the swirling fluids and removes the rotation of the fluid.

Advantageously, the outlet chamber has an axial inlet, a substantially tangential outlet for liquids and an axial outlet for gases.

Preferably, the inlet chamber, the separation chamber and the outlet chamber are substantially coaxial.

According to another aspect of the invention there is provided an apparatus for separating fluids, the apparatus including a cyclonic separator according to any one of the preceding claims, and a separator device that is connected to receive fluids flowing through at least one of the outlets. The separator device removes any liquid carried over in the removed gases. The separator device preferably comprises a knock-out vessel.

According to another aspect of the invention there is provided a method of separating single-phase fluids, comprising passing the fluids through a cyclonic separator, separating the fluids by cyclonic action into a gas portion and a liquid portion, and capturing through separate outlets any gases and liquids exiting the separator.

The method may comprise passing fluids including liquids and dissolved gases through a cyclonic separator to separate at least some of the dissolved gases from the liquids, and capturing the gases and liquids separately as they flow through the respective outlets.

Advantageously, the pressure of the fluids is reduced while passing them through a cyclonic separator to a value of less than 0.9 bar absolute, preferably approximately 0.4 bar absolute if the inlet pressure is in the range of approximately 2 to 3 bar absolute.

Certain embodiments of the invention will now be described, by way of example, with reference to the accompanying drawings, in which:

DETAILED DESCRIPTION OF THE PREFERRED EMBODIMENT

Figure 1:
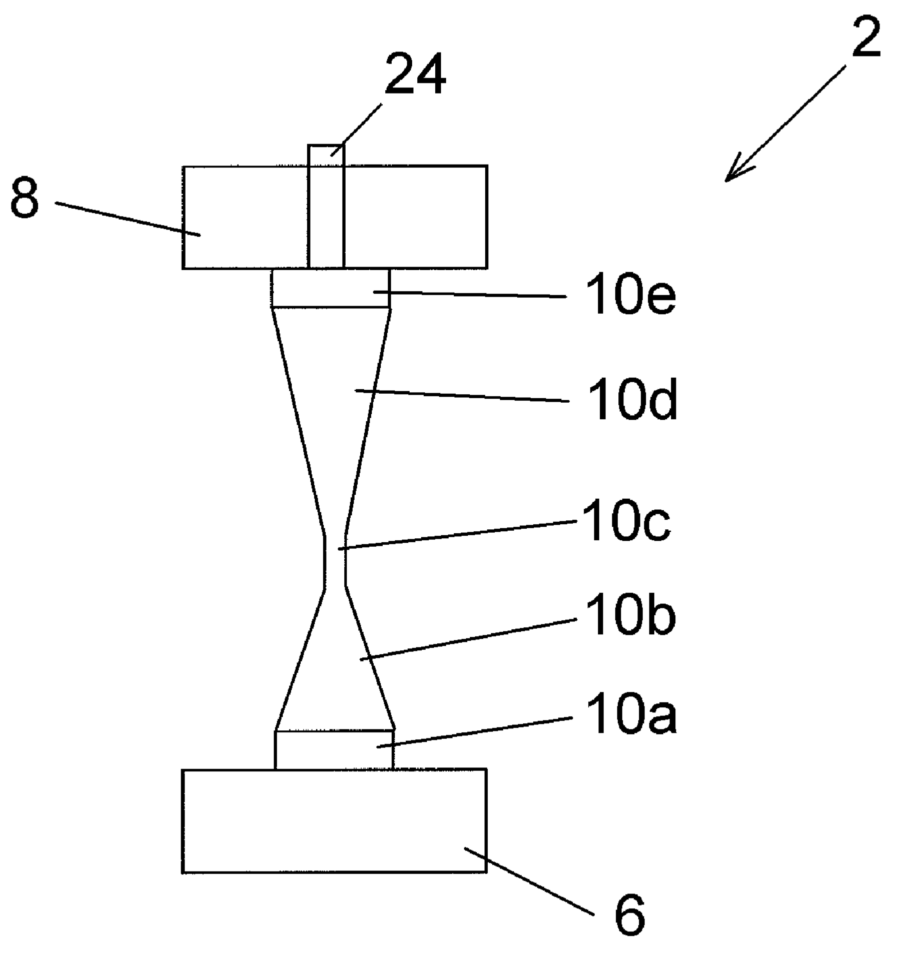
FIG. 1 is a schematic side view showing the general configuration of a cyclonic separator according to an embodiment of the invention.
Figure 2:
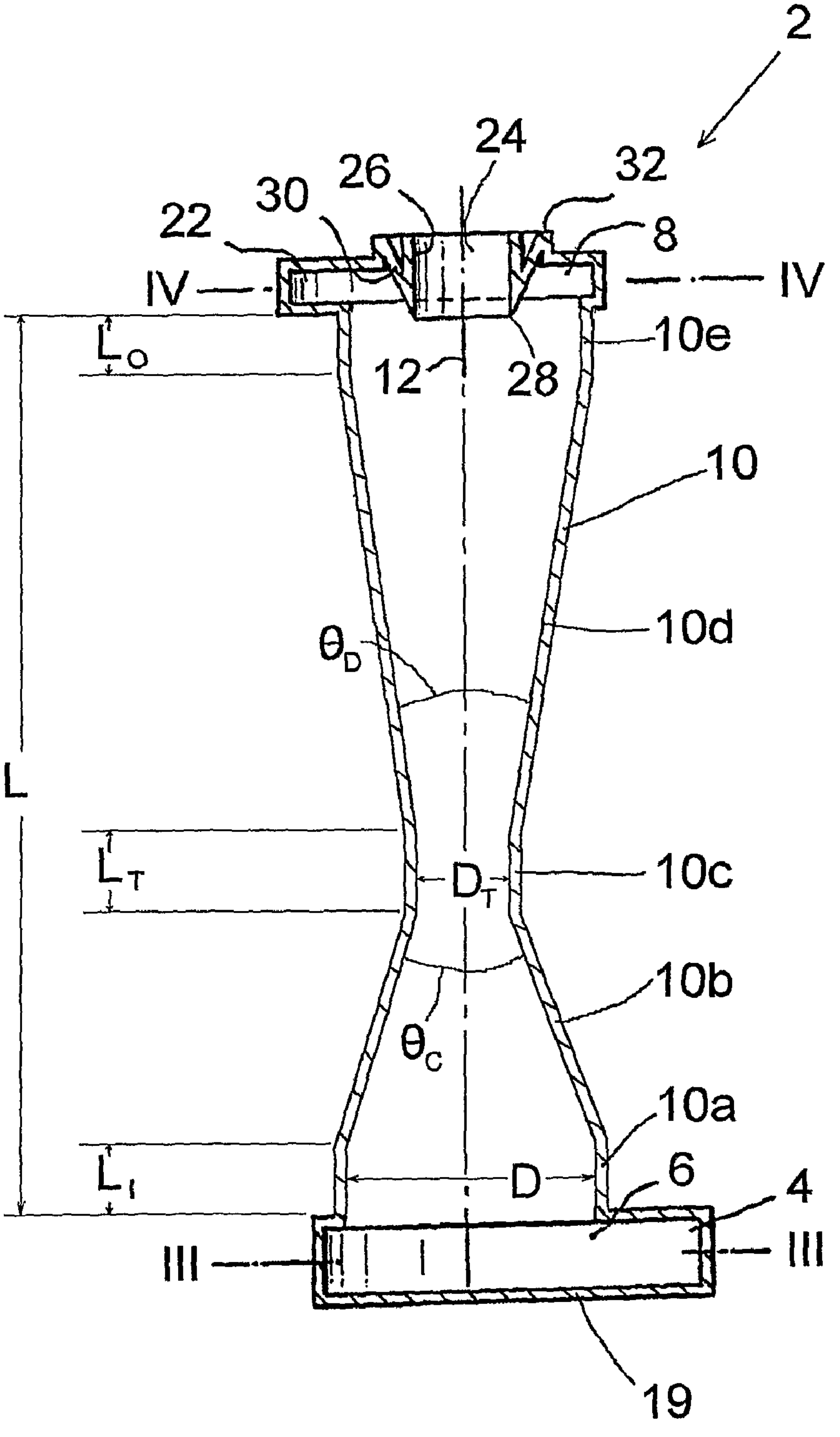
FIG. 2 is a sectional side view of the separator shown in FIG. 1.
Figure 4:
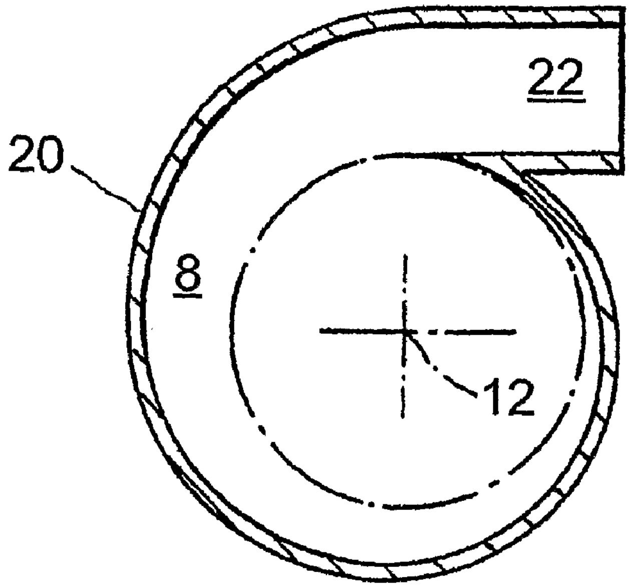
FIG. 4 is a cross-section on line IV-IV of FIG. 2.
Figure 3:
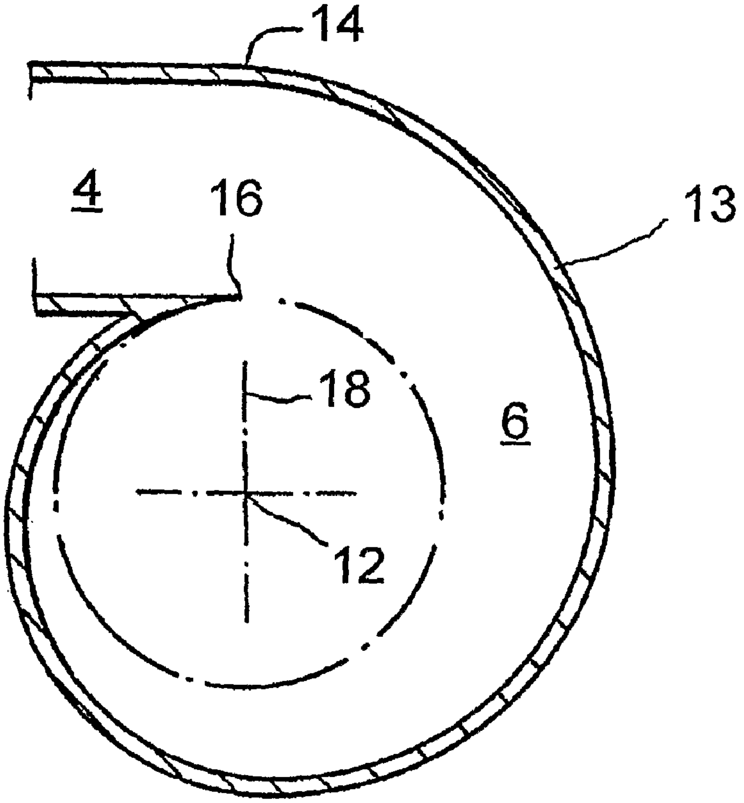
FIG. 3 is a cross-section on line of FIG. 2.

The cyclonic separator 2 shown in FIGS. 1 to 4 includes an inlet conduit 4, involute shaped inlet and outlet chambers 6, 8 and an intermediate separation chamber 10 that joins the inlet and outlet chambers along the common axis 12 of the three chambers.

The inlet chamber 6 includes an inlet duct defined by a curved wall 13 that extends through 360 degrees around the axis 12. The involute shape of the inlet chamber 6 may for example be similar to that described in patent application WO99/22873A. The radius of the wall 13 decreases from a maximum radius at 14 to a minimum radius at 16, and the cross-sectional area of the inlet duct decreases towards its downstream end. The downstream end of the tangential inlet conduit 4 is defined on the outside by the maximum radius portion 14 of the curved wall, and on the inside by the minimum radius portion 16 of the wall. The innermost section of the involute inlet chamber 6 is centred on the normal 18 which passes through the axis 12. The lower face of the inlet chamber 6 is closed by a plate 19. The upper face of the inlet chamber 6 opens into the intermediate chamber 10.

The intermediate separation chamber 10 is circular in section and includes an inlet portion 10*a*, a convergent portion 10*b*, a throat portion 10*c*, a divergent portion 10*d* and an outlet portion 10*e*. The inlet portion 10*a*, the throat portion 10*c* and the outlet portion 10*e* are all cylindrical in shape, while the convergent portion 10*b* and the divergent portion 10*d* are frusto-conical. The radius of the inlet portion 10*a* is slightly smaller than the minimum radius 16 of the inlet involute chamber 6.

The outlet involute chamber 8 includes an outlet duct defined by a curved wall 20 that extends through 360 degrees around the axis 12 and leads to a tangential outlet conduit 22 for heavier phases of the separated fluids. The involute shape of the outlet chamber 8 may for example be as described in WO99/22873A. The radius of the wall 20 increases and the cross-sectional area of the inlet duct increases towards its downstream end. The curvature of the wall 20 thus changes in the opposite manner to that of the inlet involute chamber 6, the outlet involute chamber 8 being arranged to receive fluids swirling in the same sense about the axis 12 as those exiting the inlet chamber 6. The outlet involute chamber 8 also includes an axial outlet conduit 24 (or "vortex finder") for the lighter phases of the separated fluids. The axial outlet conduit 24 comprises a co-axial inner cylinder 26 that extends through the outlet chamber and protrudes at 28 slightly into the intermediate chamber 10. A frusto-conical wall 30 surrounds the inner cylinder 26, tapering outwards from the entry of the axial outlet to the far end 32 of the outlet involute.

In use, fluids consisting of liquids, dissolved gases and possibly some free gases are introduced into the separator through the inlet conduit 4. These fluids follow the increasing curvature of the curved wall 13 of the inlet involute chamber 6 and are rapidly rotated through 360° so that they swirl around the axis 12 with increasing velocity. The swirling fluids in the inlet involute chamber 6 create a vortex with a pressure gradient having a low pressure point substantially on the axis 12. If the fluids include any free gases, these will move inwards towards the centre of the vortex while the denser liquids move outwards towards the wall 13.

The swirling fluids then pass into and through the intermediate separator chamber 10. As the fluids pass through the convergent portion 10*b* and approach the narrow throat 10*c*, the rotational velocity increases and the pressure in the centre of the vortex decreases still further. If the pressure is reduced sufficiently, any dissolved gases in the liquid will come out of solution and form bubbles of gas within the liquid. These bubbles will be less dense than the liquid and so will tend to move inwards towards the axis 12, while the denser liquid will move outwards towards the outer wall of the separator chamber 10. This causes a separation of the gas from the liquid.

As the swirling fluids leave the throat section 10*c* and travel through the divergent portion 10*d*, the rotational velocity decreases and the pressure at the centre of the vortex increases. The divergent portion 10*d* thus provides a pressure recovery stage. Separation of the gases from the liquids is maintained, the gases being located at the centre of the vortex near the axis 12 while the liquids continue to rotate around the wall of the chamber. The length and shape of the separation chamber promote a highly stable vortex during this pressure recovery stage.

The swirling vortex of fluids then enters the outlet involute chamber 8. The less dense gases near the axis 12 leave through the axial outlet conduit 24, while the denser liquids are guided by the curved wall 20 through the tangential outlet conduit 22. Good separation of the gas and liquid phases is assisted by the tapered shield 30 of axial outlet conduit 24. The increasing radius of the wall 20 further reduces the rotational speed and increases the outlet pressure of the liquid phases exiting through the tangential outlet conduit 22, so that the overall pressure drop across the cyclonic separator is minimal. If required, the pressure drop in the gases can also be reduced by feeding the gases flowing through the axial outlet conduit 24 into a further involute chamber.

The gases leaving through the axial outlet conduit 24 may carry with them a small quantity of liquid in the form of droplets. If required, these carried over liquids can be separated by feeding the fluids passing through the axial outlet conduit 24 to a conventional separator or knock-out vessel via an outlet line.

In use, fluids are fed to the cyclonic separator 2 and are separated into gas and liquid phases. The gases leave the separator through the axial outlet conduit 24 The liquid phases leave the cyclonic separator 2 through the tangential outlet conduit 22.

The efficiency of the cyclonic separator depends largely on the shape and dimensions of the intermediate separation chamber 10. In the embodiment shown in FIGS. 1 to 4, the diameter $D_T$ of the throat portion 10*c* is approximately half the diameter D of the inlet portion 10*a*, while the length $L_T$ of the throat portion 10*c* is approximately equal to the throat diameter $D_T$. The diameter of the outlet portion 10*e* is similar to the diameter of the inlet portion. The total length L of the separation chamber 10 is generally approximately five to ten times the diameter D of the inlet portion 10*a*. The length $L_I$ of the inlet portion 10*a* and the length $L_o$ of the outlet portion 10*e* are both approximately one third the diameter D of the inlet portion 10*a*. The wall of the convergent portion 10*b* is frusto-conical and is inclined such that the included angle $\theta_C$ between opposite sides of the wall is approximately 20°. The wall of the divergent portion 10*d* is also frusto-conical and has an included angle $\theta_D$ of approximately 10°. These dimensions are only illustrative: other dimensions and shapes are also possible, preferred ranges being indicated below.

| Quantity | Good | Better | Best |
|---|---|---|---|
| L/D | 1 to 10 | 2 to 10 | 5 to 6 |
| $D_T/D$ | 0.3 to <1.0 | 0.4 to 0.9 | 0.5 to 0.9 |
| $L_T/D_T$ | 0 to 3.5 | 0.1 to 3 | 0.5 to 2.5 |
| $\theta_C$ | 0° to 45° | 5° to 40° | 5° to 30° |
| $\theta_D$ | 0° to 30° | 2° to 20° | 5° to 15° |
| $L_I/D$ | 0 to 2 | 0.1 to 1 | 0.2 to 0.8 |
| $L_O/D$ | 0 to 2 | 0.1 to 1 | 0.2 to 0.8 |

The shape of the intermediate separation chamber 10 may be varied without departing from the scope of the invention. For example, instead of having discrete sections (i.e. the inlet, convergent, throat, divergent and outlet portions) with well-defined joins, those sections can merge into one another through the use of radiused joints or continuously curved walls.

We have found that it is possible to achieve a pressure in the centre of the vortex within the throat portion 10*c* ranging from just below atmospheric to as low as 0.3 bar absolute, with an inlet pressure of 2 to 3 bar absolute. This compares with a minimum pressure of 0.9 bar absolute achievable under similar conditions with the cyclonic separator described in WO99/22873A. This provides a much greater degassing effect with a lower energy requirement. The vortex is also much more stable, resulting in a much lower quantity of liquid being carried over in the removed gas (typically less than 10% as compared to 30% previously).

The cyclonic separator may be used in various different situations for removing dissolved gases from liquids including, for example, the oil and gas industry, the chemicals and pharmaceutical industries and the water industry. It may also be used to separate two fluids having different vapour pressures.

The invention claimed is:

1. A cyclonic separator for separating a single phase fluid into a gas phase and a liquid phase, said single phase fluid comprising either a liquid containing dissolved gas or a mixture of liquids with different vapor pressures, the cyclonic separator comprising an inlet chamber, a cyclonic separation chamber and an outlet chamber, all arranged sequentially to allow fluids to flow substantially uniaxially through the separator, wherein the inlet chamber comprises a curved inlet duct of decreasing radius that induces fluids flowing through the chamber to swirl around an axis, wherein the cyclonic separation chamber receives fluids from the inlet chamber, increases a rotational speed of the fluids and separates the fluids by cyclonic action into a gas portion and a liquid portion, wherein the outlet chamber is connected to receive the gas and liquid portions from the cyclonic separation chamber and comprises a curved outlet duct of increasing radius, a first outlet for liquids and a second outlet for gases, wherein the separation chamber is elongate and has a length L and an inlet diameter D, wherein L/D is in the range of 1 to 10, and includes a throat portion with a diameter $D_T$, wherein $D_T<D$, and includes a convergent portion upstream of the throat portion and a divergent portion downstream of the throat portion.

2. A cyclonic separator according to claim 1, wherein the throat diameter $D_T/D$ is in the range of 0.3 to <1.0.

3. A cyclonic separator according to claim 1, wherein the throat portion has a length $L_T$, wherein $L_T/D_T$ is in the range of 0 to 3.5.

4. A cyclonic separator according to claim 1, wherein the convergent portion is enclosed by a wall which is inclined at an included angle $\theta_c$ that is less than 45°.

5. A cyclonic separator according to claim 1, wherein the elongate separation chamber includes a cylindrical inlet portion upstream of the convergent portion.

6. A cyclonic separator according to claim 5, wherein the inlet portion has a length $L_1$, wherein $L_1$ /D is less than 2.

7. A cyclonic separator to claim 1, wherein the divergent portion is enclosed by a wall which is inclined at an included angle $\theta_D$ that is less than 30.

8. A cyclonic separator according to claim 1, wherein the elongate separation chamber includes a cylindrical outlet portion downstream of the divergent portion.

9. A cyclonic separator according to claim 8, wherein the outlet portion has a length $L_O$, where $L_O/D$ is less than 2.

10. A cyclonic separator according to claim 1, wherein the curved inlet duct has a decreasing cross-sectional area.

11. A cyclonic separator according to claim 1, wherein the curved inlet duct has an involute shape.

12. A cyclonic separator according to claim 1, wherein the curved inlet duct extends around approximately 360°.

13. A cyclonic separator according claim 1, wherein the inlet chamber has a substantially tangential inlet and an axial outlet.

14. A cyclonic separator according to claim 1, wherein the curved outlet duct has an increasing cross-sectional area.

15. A cyclonic separator according to claim 1, wherein the curved outlet duct has an involute shape.

16. A cyclonic separator according to claim 1, wherein the curved outlet duct extends around approximately 360°.

17. A cyclonic separator according claim 1, wherein the outlet chamber has an axial inlet, a substantially tangential outlet for liquids and an axial outlet for gases.

18. A cyclonic separator according claim 1, wherein the inlet chamber, the separation chamber and the outlet chamber are substantially coaxial.

19. A method of separating a single phase fluid into a gas phase and a liquid phase, said single phase fluid comprising either a liquid containing dissolved gas or a mixture of liquids with different vapour pressures, the method comprising passing the fluids through a cyclonic separator comprising an inlet chamber with a curved inlet duct of decreasing radius, a cyclonic separation chamber with a throat portion, a convergent portion upstream of the throat portion and a divergent portion downstream of the throat portion, and an outlet chamber with a curved outlet duct of increasing radius, separating the fluids by cyclonic action into a gas portion and a liquid portion, and capturing through separate outlets any gases and liquids exiting the separator.

20. A method according to claim 19, comprising passing fluids including liquids and dissolved gases through a cyclonic separator to separate at least some of the dissolved gases from the liquids, and capturing the gases and liquids separately as they flow through the respective outlets.

21. A method according to claim 19, comprising passing fluids including at least two liquids having different vapour pressures through a cyclonic separator to convert at least one of the liquids to a gas, separating at least some of the evolved gases from the liquids, and capturing the gases and liquids separately as they flow through the respective outlets.

22. A method according to claim 19, wherein the pressure of the fluids is reduced while passing them through the cyclonic separator to a value of less than 0.9 bar absolute, when the inlet pressure is 3 bar absolute or lower.

23. A method according to claim 19, comprising passing the fluids through a cyclonic separator according claim 1.

24. The cyclonic separator according to claim 2, wherein the throat diameter $D_T/D$ is in the range of 0.5 to 0.9.

25. The cyclonic separator according to claim 3, wherein $L_T/D_T$ is in the range of 0.1 to 3.

26. The cyclonic separator according to claim 4, wherein the wall is inclined at an included angle $\theta_c$ that is in the range of 5° to 45°.

27. The cyclonic separator according to claim 26, wherein the wall is inclined at an included angle $\theta_c$ that is in the range of 5° to 30°.

28. The cyclonic separator according to claim 6, wherein $L_1/D$ is in the range of 0.1 to 1.

29. The cyclonic separator according to claim 7, wherein the wall is inclined at an included angle $\theta_D$ that is in the range of 2° to 20°.

30. The cyclonic separator according to claim 9, wherein $L_O/D$ is in the range of 0.1 to 1.

31. The method of claim 22, wherein the pressure of the fluids is reduced while passing them through the cyclonic separator to a value of less than about 0.4 bar absolute.

* * * * *

UNITED STATES PATENT AND TRADEMARK OFFICE

CERTIFICATE OF CORRECTION

PATENT NO. : 8,313,565 B2
APPLICATION NO. : 12/377049
DATED : November 20, 2012
INVENTOR(S) : Mahmood Mir Sarshar et al.

It is certified that error appears in the above-identified patent and that said Letters Patent is hereby corrected as shown below:

In the Specifications:

At Column 3, Line 10, Change “carry over” to --carryover--.

At Column 3, Line 49, Change “$L_i$,” to --$L_I$,--.

At Column 6, Line 43, Change “$L_o$” to --$L_O$--.

In the Claims:

At Column 7, Line 49, In Claim 4, change “$\theta_c$” to --$\theta_C$--.

At Column 7, Line 54, In Claim 6, change “$L_1$,” to --$L_I$,--.

At Column 7, Line 54, In Claim 6, change “$L_1$ /D” to --$L_I$/D--.

At Column 7, Line 55, In Claim 7, change “separator to” to --separator according to--.

At Column 8, Line 3, In Claim 13, change “according claim” to --according to claim--.

At Column 8, Line 11, In Claim 17, change “according claim” to --according to claim--.

At Column 8, Line 14, In Claim 18, change “according claim” to --according to claim--.

At Column 8, Line 44, In Claim 23, change “according claim” to --according to claim--.

At Column 8, Line 50, In Claim 26, change “$\theta_c$” to --$\theta_C$--.

At Column 8, Line 53, In Claim 27, change “$\theta_c$” to --$\theta_C$--.

At Column 8, Line 56, In Claim 28, change “$L_1$/D” to --$L_I$/D--.

Signed and Sealed this
Fourteenth Day of May, 2013

Teresa Stanek Rea
*Acting Director of the United States Patent and Trademark Office*